United States Patent
Martin et al.

(10) Patent No.: US 11,785,530 B2
(45) Date of Patent: Oct. 10, 2023

(54) PREVENTING THE USE OF A WIRELESS TERMINAL IN A PROSCRIBED AREA

(71) Applicant: Polaris Wireless, Inc., Mountain View, CA (US)

(72) Inventors: Robert Lewis Martin, Antioch, CA (US); Mahesh B Patel, Saratoga, CA (US); Aamir Abdul Sattar, Mountain View, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 137 days.

(21) Appl. No.: 17/390,815

(22) Filed: Jul. 30, 2021

(65) Prior Publication Data

US 2023/0030334 A1 Feb. 2, 2023

(51) Int. Cl.
- H04W 4/00 (2018.01)
- H04W 48/04 (2009.01)
- H04W 64/00 (2009.01)
- H04W 4/021 (2018.01)

(52) U.S. Cl.
CPC ........... H04W 48/04 (2013.01); H04W 4/021 (2013.01); H04W 64/003 (2013.01)

(58) Field of Classification Search
CPC .... H04W 48/04; H04W 4/021; H04W 64/003
See application file for complete search history.

(56) References Cited

U.S. PATENT DOCUMENTS

| 8,195,198 | B1* | 6/2012 | Shaw | H04W 48/04 455/456.4 |
| 2010/0304712 | A1* | 12/2010 | Sweeney | H04W 12/08 455/410 |

* cited by examiner

Primary Examiner — Justin Y Lee
(74) Attorney, Agent, or Firm — McGeary Cukor LLC; Jason Paul Demont; Kenneth Ottesen

(57) ABSTRACT

A wireless telecommunication system is described that denies wireless telecommunication service to a wireless terminal in a proscribed area (e.g., prison, military installation, academic testing center, school, etc.). The system comprises an adjunct called a "service sentry." The service sentry uses measurements of the location-dependent traits of the radio signals transmitted to, and received from, each wireless terminal in its purview to generate an estimate of the location of the wireless terminal. When the service sentry estimates that the wireless terminal has entered the proscribed area, it requests that the wireless switching center that services the proscribed area deny service to the wireless terminal. When the service sentry estimates that the wireless terminal has exited the proscribed area, it requests that the wireless switching center that services the proscribed area restore service to the wireless terminal.

5 Claims, 8 Drawing Sheets

Wireless Telecommunication System 100
(with Jammer for Proscribed Area 121 Denial)

Figure 3  Wireless Telecommunication System 300 (using Operator Determined Barring & Equipment Identity Register for Proscribed Area 321 Denial)

PREVENTING THE USE OF A WIRELESS TERMINAL IN A PROSCRIBED AREA

FIELD OF THE INVENTION

The present invention relates to wireless telecommunications in general and, more particularly, to a method for preventing the use of a wireless terminal in a proscribed area.

BACKGROUND OF THE INVENTION

Reliable and inexpensive wireless telecommunications service is available almost everywhere, and it is a great benefit for society. There are, however, some places (e.g., prisons, classified military installations, academic testing centers, houses of worship, theaters, etc.) where the authorities do not want people to be able to use a wireless terminal. For example, the proliferation of contraband wireless terminals in prisons is a well-known and serious problem.

There are two solutions in the prior art for preventing the use of wireless terminals in proscribed areas: jammers and IMSI-catchers.

FIG. 1 depicts a schematic diagram of the salient components of wireless telecommunications system 100, which uses a jammer that prevents the use of wireless terminals in a proscribed area.

Wireless telecommunications system 100 comprises: wireless terminal 101, cellular base stations 102-1, 102-2, and 102-3, cellular signal jammer 103, wireless switching center 111, service area 120, and proscribed area 121, interrelated as shown. The purpose of wireless telecommunication system 100 is to provide wireless telecommunications service (e.g., voice, data, text, photographs, video, etc.) to the wireless terminals within service area 120 but to prevent the use of wireless terminals within proscribed area 121.

Cellular signal jammer 103 is placed within proscribed area 121 where it radiates one or more signals that "jam" the radio signals transmitted or received by the wireless terminals (e.g., wireless terminal 101, etc.) in its purview. This has the effect of rendering them useless.

In general, the number of jammers used and their location, their radiated power, and the directionality of their antennas determines the size and shape of the proscribed area. It is well known in the prior art how to use jammers to prevent the use of wireless terminals in a proscribed area.

FIG. 2 depicts a schematic diagram of the salient components of wireless telecommunications system 200, which uses an IMSI-catcher to prevent the use of wireless terminals in a proscribed area.

Wireless telecommunications system 200 comprises: wireless terminal 201, cellular base stations 202-1, 202-2, and 202-3, IMSI-catcher 203, wireless switching center 211, service area 220, and proscribed area 221, interrelated as shown. The purpose of wireless telecommunications system 200 is to provide wireless telecommunications service to the wireless terminals within service area 220, and the purpose of IMSI-catcher 203 is to enable the wireless terminals in proscribed area 221 to be located and confiscated.

It is well known in the prior art how to make and use an IMSI-catcher to prevent the use of wireless terminals in a proscribed area.

SUMMARY OF THE INVENTION

The present invention prevents the use of a wireless terminal in a proscribed area (e.g., prisons, classified military installations, academic testing centers, houses of worship, theaters, etc.) without some of the costs and disadvantages for doing so in the prior art.

Some authorities use cellular signal jammers to prevent the use of wireless terminals in a proscribed area, but jammers have disadvantages. First, a jammer is a tangible electronic device with an antenna, and it must be physically located inside of the proscribed area. This leaves it vulnerable to being disabled or destroyed by the people who object to its existence. It might be unlikely that the parishioners in a house of worship would disable or destroy a jammer, but prisoners, spies, and students are likely to. Second, a jammer jams all of the wireless terminals in its purview, including those of people who the authorities not want to jam. In other words, a jammer cannot discriminate between "authorized" and "unauthorized" wireless terminals but jams them all.

In contrast, some authorities use an IMSI-catcher to locate and confiscate the wireless terminals in a proscribed area. This has the advantage over a jammer in that the operator of the IMSI-catcher can discriminate between authorized and unauthorized wireless terminals, but it also requires an operator who is impervious to influence or bribery. In practice, experience has shown that too many operators—especially those in prisons—can be compromised.

The illustrative embodiment of the present invention requires neither the presence of a jammer nor a human operator in the proscribed area. Instead, the illustrative embodiment comprises an adjunct to the wireless switching center called a "service sentry."

In accordance with the illustrative embodiment, the service sentry continually estimates the location of each wireless terminal serviced by the wireless switching center. This is accomplished using well-known radio-location techniques, such as radio-frequency pattern matching, triangulation, and/or trilateralization.

When the service sentry estimates that the wireless terminal has entered the proscribed area, it requests the wireless switching center to deny service to the wireless terminal. When the service sentry estimates that the wireless terminal has exited the proscribed area, it requests the wireless switching center to restore service to the wireless terminal.

Furthermore, the service sentry can be instructed to "whitelist" one or more "authorized" wireless terminals (i.e., the wireless terminals of those people who the authorities want to be able to use their wireless terminal in the proscribed area). In those cases, the service sentry does not request that the wireless switching center deny service to the wireless terminal, even when it estimates that it is in the proscribed area.

The service sentry uses different methods for requesting the denial and restoration of service for wireless terminals that are roaming than for those that are not roaming. For wireless terminals that are roaming, the service sentry transmits a request to the equipment identity register in the wireless switching center asking that the wireless terminal be "blacklisted" or "un-blacklisted," as appropriate. In contrast, for wireless terminals that are not roaming, the service sentry transmits a request to the operator determined barring module in the wireless switching center asking that the wireless terminal be "blocked" or "un-blocked," as appropriate.

The illustrative embodiment comprises: receiving a first signal that is evidence of the location of a first wireless terminal at a first time, wherein the first wireless terminal is being provided telecommunications service by a telecommunications system; generating a first estimate of whether the first wireless terminal is within a proscribed area at the first time based on the first signal; and transmitting, to an operator determined barring module in the telecommunications system, a request to block service to the first wireless terminal when the first wireless terminal is estimated to be within the proscribed area.

DEFINITIONS

Figure 1:
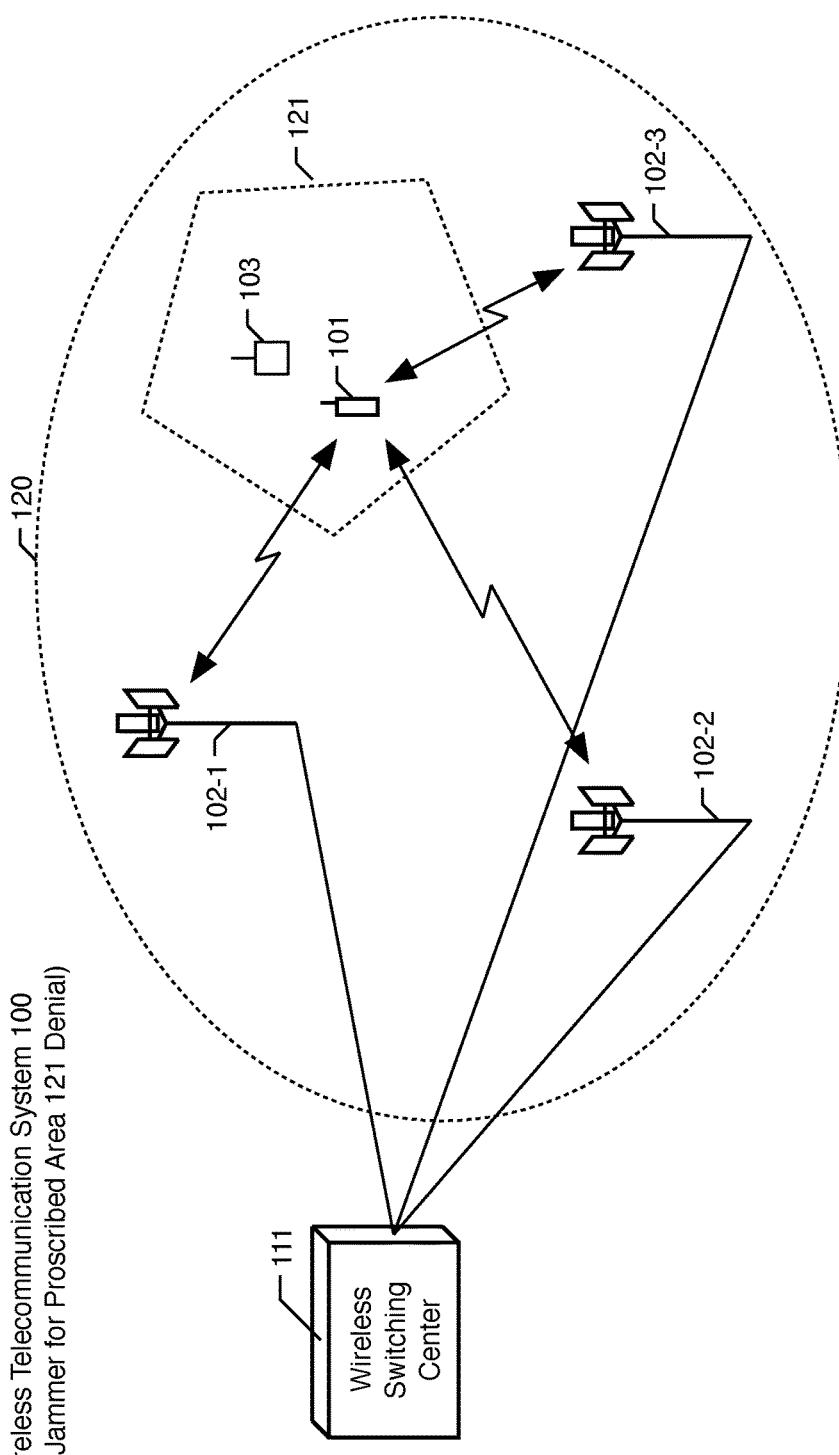
FIG. 1 depicts a schematic diagram of the salient components of wireless telecommunications system 100 in accordance with the prior art.
Figure 2:
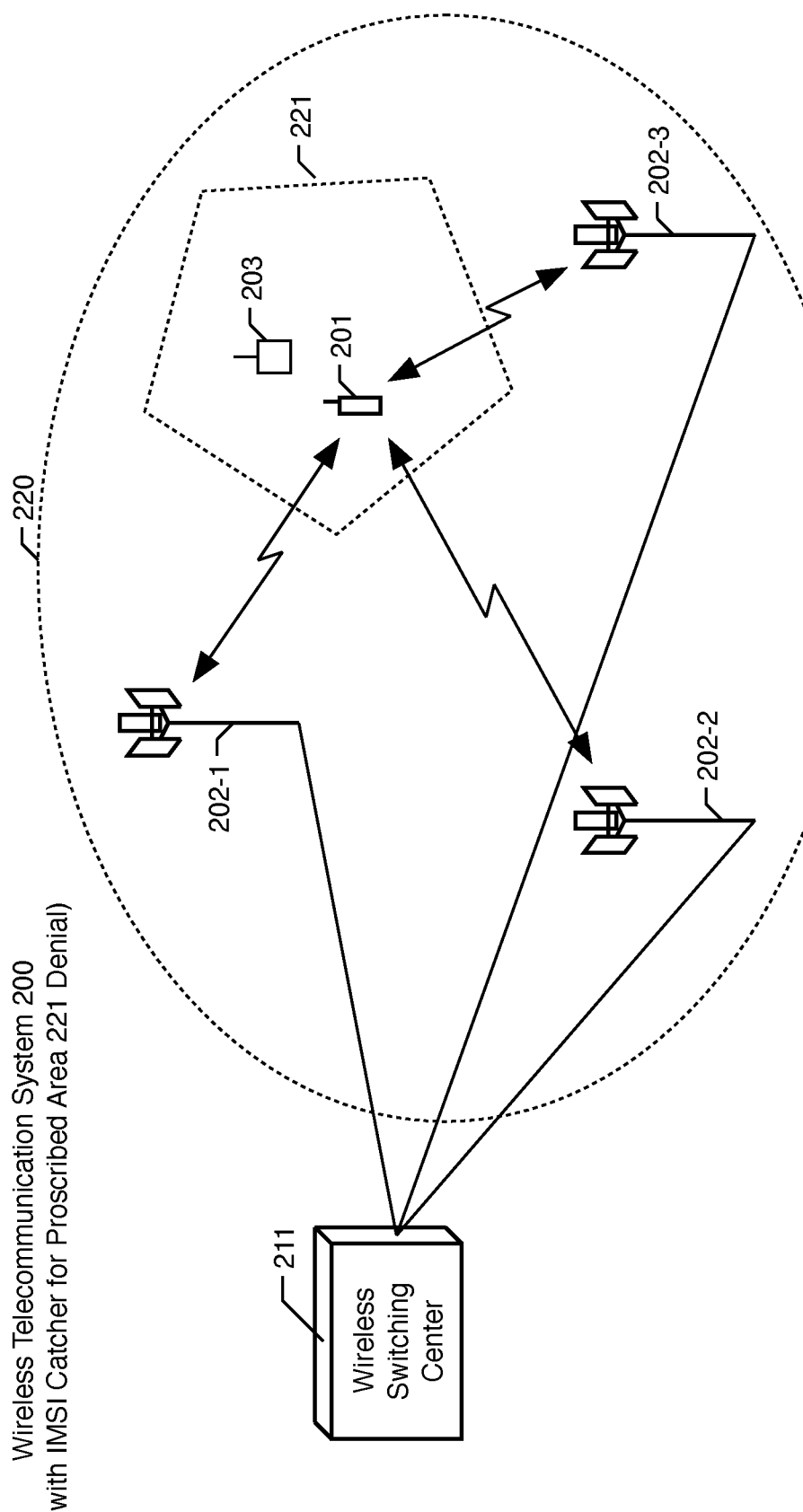
FIG. 2 depicts a schematic diagram of the salient components of wireless telecommunications system 200 in accordance with the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Excess Path Loss—For the purposes of this specification, the "excess path loss" is defined as the attenuation experienced by a hypothetical radio signal—in excess of the free-space path loss—as it propagates through a non-vacuum medium in a straight line from Point A to Point B.

Free-Space Path Loss—For the purposes of this specification, the "free-space path loss" is defined as the attenuation experienced by a hypothetical radio signal as it propagates through a vacuum in a straight line from Point A to Point B.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the phrase "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:
  (i) a measurement of a location-dependent trait (e.g., signal strength, etc.) of a radio signal as received by the wireless terminal,
  (ii) the identity of a radio signal as received by the wireless terminal (e.g., in a service environment in which different radio signals transmitted from different locations are assigned different identities, etc.), or
  (iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.

For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Partition—For the purposes of this specification, a "partition" is defined as a volume of space that is deemed to have a uniform excess path loss per meter for a signal characterized by a wavelength.

Processor—For the purposes of this specification, a "processor" is defined as hardware or hardware and software that performs mathematical and/or logical operations.

Power—For the purposes of this specification, the "power" of a radio signal is defined as the locally-averaged signal strength of the radio signal.

Radio—For the purposes of this specification, a "radio" is defined as hardware or hardware and software that is capable of telecommunications via an unguided (i.e., wireless) radio signal of frequency less than 600 GHz.

Radio-Frequency Environment—For the purposes of this specification the term "radio-frequency environment" is defined as a quantitative characterization of the nature and location of the radio-frequency obstacles in the vicinity of the reference radio, the wireless terminal, and the signal path between the reference radio and the wireless terminal.

Radio-Frequency Obstacle—For the purposes of this specification the term "radio-frequency obstacle" is defined as matter that can refract, diffract, reflect, or absorb a radio signal used in telecommunications.

Reasonable Estimate—For the purposes of this specification, the term "reasonable estimate" and its inflected forms is defined as an estimate that is based on empirical data and logic. A reasonable estimate is not necessarily correct, but it is not a blind guess.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Total Path Loss—For the purposes of this specification, the "total path loss" is defined as the sum of the free-space path loss plus the excess path loss, if any, experienced by a hypothetical radio signal as it propagates in a straight line from Point A to Point B.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a tangible device that is capable of telecommunications without a wire or tangible transmission medium. A wireless terminal can be mobile or immobile. A wireless terminal can transmit or receive or transmit and receive.

DETAILED DESCRIPTION

Figure 3:
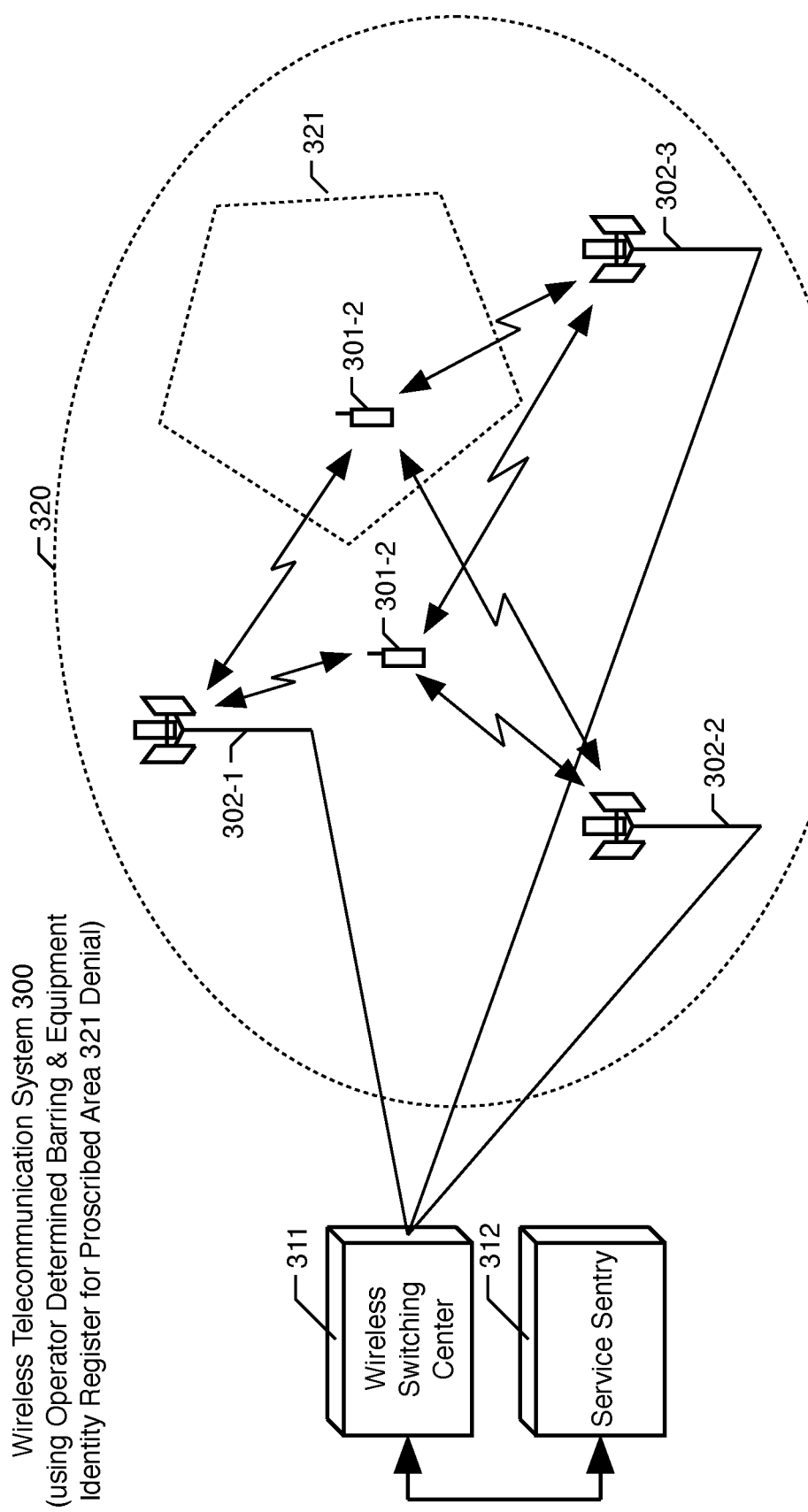
FIG. 3 depicts a diagram of the salient components of wireless telecommunications system 300 in accordance with the illustrative embodiment of the present invention.

Overview— FIG. 3 depicts a diagram of the salient components of wireless telecommunications system 300 in accordance with the illustrative embodiment of the present invention. Wireless telecommunications system 300 comprises: wireless terminals 301-1 and 301-2, cellular base stations 302-1, 302-2, and 302-3, wireless switching center 311, service sentry 312, service area 320, and proscribed area 321, as shown.

Wireless telecommunications system 300 provides wireless telecommunications service to wireless terminal 301-$j$, where j E {1, 2} in geographic region 320, in well-known fashion, except when wireless terminal 301-$j$ is within proscribed area 321. In contrast and in accordance with the illustrative embodiment, when wireless terminal 301-$j$ is within proscribed area 321, wireless telecommunications system 300 denies service to it, as described below and in the accompanying figures.

In accordance with the illustrative embodiment, wireless switching center 311 and cellular base stations 302-1, 302-2, and 302-3 provide wireless telecommunications service to wireless terminal 301-$j$ in accordance with the air-interface standard of the 3$^{rd}$ Generation Partnership Project ("3GPP"). After reading this disclosure, however, it will be clear to those skilled in the art how to make and use alternative embodiments of the present invention that operate in accordance with one or more other air-interface standards (e.g., Global System Mobile "GSM," 5G, UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. As will be clear to those skilled in the art, a wireless terminal is also known as a "cell phone," "mobile station," "car phone," "PDA," "tablet," etc.

Wireless terminal 301-1 and wireless terminal 301-2 are identical and each comprises the hardware and software necessary to be 3GPP-compliant and to perform the processes described below and in the accompanying figures. For example and without limitation, wireless terminal 301-$j$ is capable of:

a. measuring one or more location-dependent traits of each of one of more electromagnetic signals transmitted by cellular base stations 302-1, 302-2, and 302-3 and of reporting those measurements to service sentry 312, and b. transmitting one or more signals and of reporting the transmission parameters of those signals to service sentry 312.

Wireless terminal 301-$j$ is mobile and can be at any location within geographic region 320 at any time. Although wireless telecommunications system 300 comprises only two wireless terminals, it will be clear to those skilled in the art, after reading this disclosure, how to make and use alternative embodiments of the present invention that comprise any number of wireless terminals.

The "home" network of wireless terminal 301-1 is wireless switching center 311, and, therefore, wireless terminal 301-1 is a "native user" of wireless switching center 311. In contrast, the home network of wireless terminal 301-2 is not wireless switching center 311; wireless terminal 301-2 has "roamed" into service area 320, and, therefore, is a "non-native" user of wireless switching center 311.

Cellular base stations 302-1, 302-2, and 302-3 communicate with wireless switching center 311 via wireline and with wireless terminal 301-$j$ via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 302-1, 302-2, and 302-3 are terrestrial, immobile, and within geographic region 320. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 320.

In accordance with the illustrative embodiment, all of the base stations that service wireless terminal 301-$j$ are associated with wireless switching center 311. It will be clear to those skilled in the art, after reading this disclosure, how to make and use alternative embodiments of the present invention in which any number of base stations are associated with any number of wireless switching centers.

Cellular base stations 302-1, 302-2, and 302-3 comprise the hardware and software necessary to be 3GPP-compliant and to perform the processes described below and in the accompanying figures. For example and without limitation, cellular base stations 302-1, 302-2, and 302-3 are capable of:

a. measuring one or more location-dependent traits of each of one of more electromagnetic signals (transmitted by wireless terminal 301-$j$) and of reporting the measurements to service sentry 312, and b. transmitting one or more signals and of reporting the transmission parameters of those signals to service sentry 312.

Figure 4:
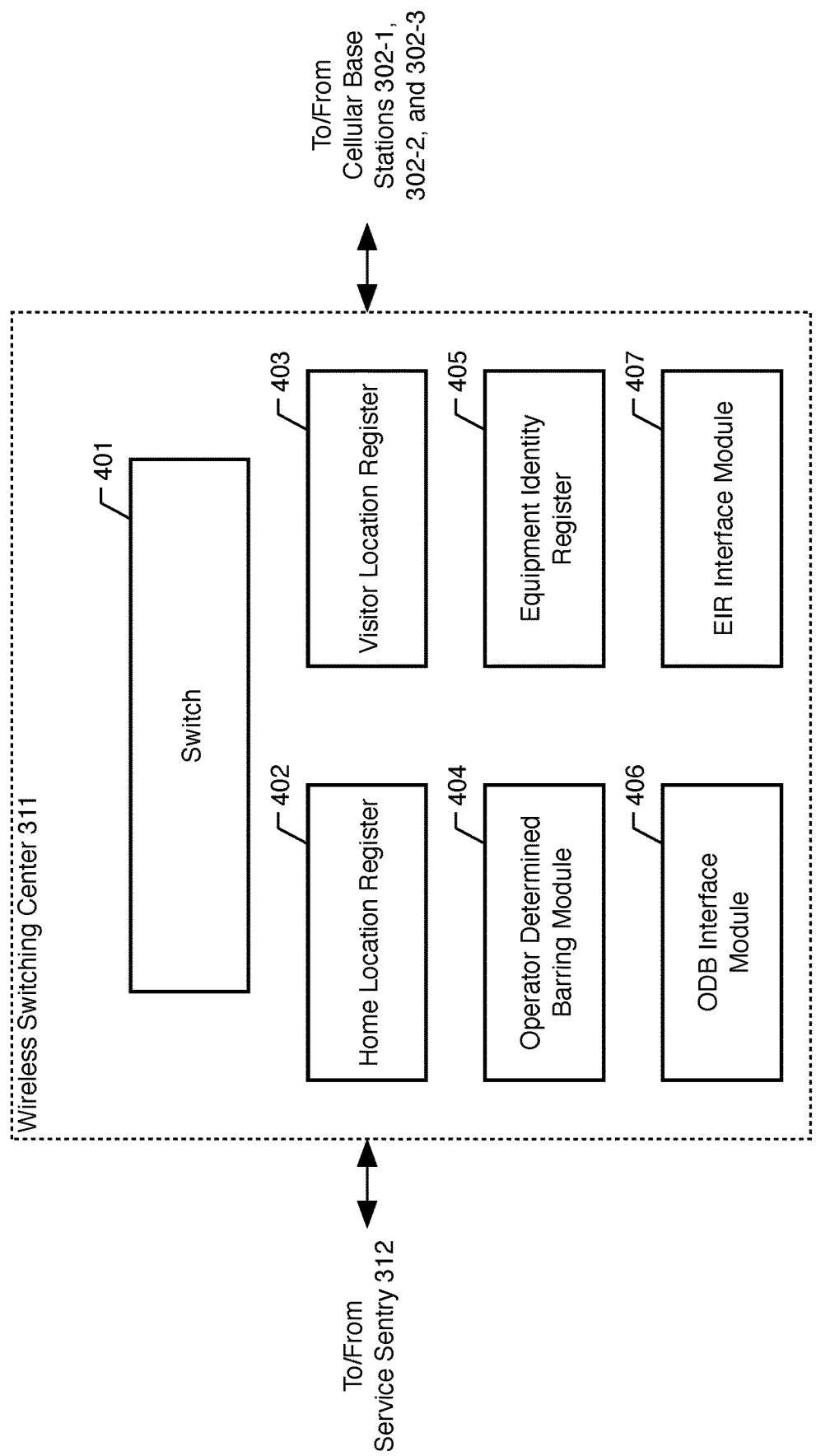
FIG. 4 depicts a schematic diagram of the salient components of wireless switching center 311, which orchestrates the provisioning of telecommunications service to wireless terminal 301-$j$.

FIG. 4 depicts a schematic diagram of the salient components of wireless switching center 311, which orchestrates the provisioning of telecommunications service to wireless terminal 301-j. Wireless switching center 311 comprises switch 401, home location register 402, visitor location register 403, operator determined barring module 404, equipment identity register 405, ODB interface module 406, and EIR interface module 407.

Switch 401 provides telecommunications routing in well-known fashion. It will be clear to those skilled in the art how to make and use switch 401.

Home location register 402 is a database that contains data for those wireless terminals that have wireless switching center 311 as their home system. In accordance with the illustrative embodiment, wireless switching center 311 is the home of wireless terminal 301-1, and, therefore, home location register 402 contains a record of wireless terminal 301-1. (For the reason explained below, home location register 402 does not contain a record of wireless terminal 301-2.) It will be clear to those skilled in the art how to make and use home location register 402.

Visitor location register 403 is a database that contains data for those wireless terminals that do not have wireless switching center 311 as their home but have roamed into service area 320. In accordance with the illustrative embodiment, wireless switching center 311 is not the home of wireless terminal 301-2, and, therefore, visitor location register 403 contains a record of wireless terminal 301-2. (For the reason explained above, visitor location register 403 does not contain a record of wireless terminal 301-1.) It will be clear to those skilled in the art how to make and use visitor location register 403.

Operator determined barring module 404 is a database that contains a list of wireless terminals that that are to be denied service by wireless switching center 311. Only wireless terminals (e.g., wireless terminal 301-1, etc.) that are listed in home location register 402 can be listed in operator determined barring module 404.

Operator determined barring module 404 is capable of receiving, in well-known fashion, a request to add a specific wireless terminal (e.g., wireless terminal 301-1, etc.) to the list, which causes telecommunications service to that wireless terminal to be stopped. The request to stop service can be initiated within wireless switching center 311, as in the prior art, or, alternatively, the request can be initiated from outside of wireless switching center 311 by service sentry 312 and received via ODB interface module 406. As is well-known to those skilled in the art, a request to add a specific wireless terminal to the list in operator determined barring module 404 is known as "blocking" the wireless terminal.

Conversely, operator determined barring module 404 is capable of receiving, in well-known fashion, a request to remove a specific wireless terminal (e.g., wireless terminal 301-1, etc.) from the list, which causes telecommunications service to that wireless terminal to be restored. The request to restore service can be initiated within wireless switching center 311, as in the prior art, or, alternatively, the request can be initiated from outside of wireless switching center 311 by service sentry 312 and received via ODB interface module 406. As is well-known to those skilled in the art, a request to remove a specific wireless terminal from the list in operator determined barring module 404 is known as "un-blocking" the wireless terminal. It will be clear to those skilled in the art how to make and use operator determined barring module 404.

Equipment identity register 405 is a database that contains a list of wireless terminals that are to be denied service by wireless switching center 311. Only wireless terminals (e.g., wireless terminal 301-2, etc.) that are listed in visitor location register 403 can be listed in equipment identity register 405.

Equipment identity register 405 is capable of receiving, in well-known fashion, a request to add a specific wireless terminal (e.g., wireless terminal 301-2, etc.) to the list, which causes telecommunications service to that wireless terminal to be stopped. The request to stop service can be initiated within wireless switching center 311, as in the prior art, or, alternatively, the request can be initiated from outside of wireless switching center 311 by service sentry 312 and received via EIR interface module 407. As is well-known to those skilled in the art, a request to add a specific wireless terminal to the list in equipment identity register 405 is known as "blacklisting" the wireless terminal.

Conversely, equipment identity register 405 is capable of receiving, in well-known fashion, a request to remove a specific wireless terminal, which causes telecommunications service to that wireless terminal to be restored. The request to restore service can be initiated within wireless switching center 311, as in the prior art, or alternatively, the request can be initiated from outside of wireless switching center 311 by service sentry 312 and received via EIR interface module 407. As is well-known to those skilled in the art, a request to remove a specific wireless terminal from the list in equipment identity register 405 is known as "un-blacklisting" the wireless terminal. It will be clear to those skilled in the art how to make and use equipment identity register 405.

ODB interface module 406 is software that provides an application programming interface ("API") to operator determined barring module 404 by an entity outside of wireless switching center 311 (e.g., service sentry 312, etc.) to request that a specific wireless terminal be added or removed from the list in operator determined barring module 404. It will be clear to those skilled in the art, after reading this specification, how to make and use ODB interface module 406.

EIR interface module 407 is software that provides an application programming interface ("API") to equipment identity register 405 by an entity outside of wireless switching center 311 (e.g., service sentry 312, etc.) to request that a specific wireless terminal be added or removed from the list in equipment identity register 405. It will be clear to those skilled in the art, after reading this specification, how to make and use EIR interface module 407.

Figure 5:
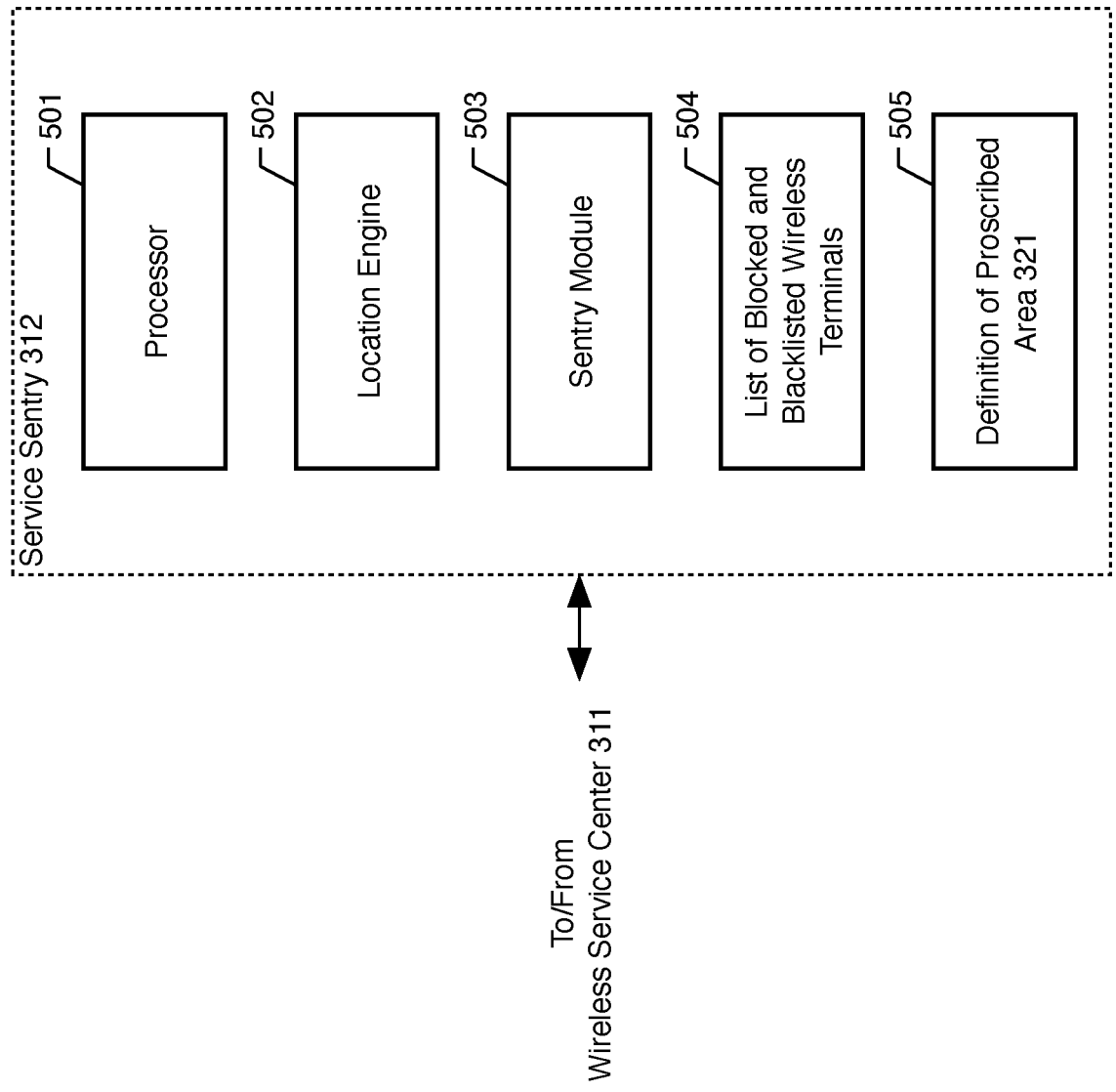
FIG. 5 depicts the salient components of service sentry 312, which orchestrates the process for denying service to wireless terminal 301-$j$ when it is within proscribed area 321 and for restoring service to wireless terminal 301-$j$ when it exits proscribed area 321.

FIG. 5 depicts the salient components of service sentry 312, which orchestrates the process for denying service to wireless terminal 301-j when it is within proscribed area 321 and for restoring service to wireless terminal 301-j when it exits proscribed area 321. In general, service sentry 312 comprises hardware and software that is capable of performing the processes described below and in the accompanying figures. In accordance with the illustrative embodiment, service sentry 312 comprises processor 501, location engine 502, sentry module 503, list of blocked and blacklisted wireless terminals 504, and definition of proscribed area 321.

Processor 501 is a general purpose processor, as is well known to those skilled in the art, that executes the software in sentry module 502 and location engine 502 and updates list of blocked and blacklisted wireless terminals 504, as described below and in the accompanying figures. It will be clear to those skilled in the art how to make and use processor 501.

Location engine 502 is a software module that generates:

(i) an estimate of the location of wireless terminal 301-*j*, and (ii) a measure of the certainty of the estimate of the location of wireless terminal 301-*j*, based on the signals that service sentry 312 receives from wireless terminal 301-*j*, cellular base stations 302-1, 302-2, and 302-3, and wireless switching center 311 that are evidence of the location of wireless terminal 301-*j*. It will be clear to those skilled in the art, after reading this disclosure, how to make and use alternative embodiments of the present invention that generate and use a measure of the uncertainty of the estimate of the location of a wireless terminal.

The details for making and using location engine 502 are described in:

U.S. Pat. No. 6,269,246 B1, and
U.S. Pat. No. 6,782,265 B2, and
U.S. Pat. No. 6,944,465 B2, and
U.S. Pat. No. 7,116,987 B2, and
U.S. Pat. No. 7,233,799 B2, and
U.S. Pat. No. 7,257,414 B2, and
U.S. Pat. No. 7,383,051 B2, and
U.S. Pat. No. 7,433,695 B2, and
U.S. Pat. No. 7,460,505 B2, and
U.S. Pat. No. 7,734,298 B2, and
U.S. Pat. No. 7,753,278 B2, and
U.S. Pat. No. 7,796,966 B2, and
U.S. Pat. No. 7,899,467 B2, and
U.S. Pat. No. 8,532,676 B1, and
U.S. Pat. No. 8,630,665 B1, and
U.S. Pat. No. 8,712,428 B2, and
U.S. Pat. No. 8,891,393 B2, and
U.S. Pat. No. 8,965,393 B2, and
U.S. Pat. No. 9,165,288 B2, and
U.S. Pat. No. 9,237,423 B2, and
U.S. Pat. No. 9,247,516 B2, and
U.S. Pat. No. 9,285,455 B2, and
U.S. Pat. No. 9,332,389 B2, and
U.S. Pat. No. 9,398,402 B2, and
U.S. Pat. No. 9,596,571 B2, and
U.S. Pat. No. 9,942,713 B1, and
U.S. Pat. No. 9,967,703 B2, and
U.S. Pat. No. 10,123,298 B1, and
U.S. Pat. No. 10,145,935 B1, and
U.S. Pat. No. 10,412,699 B1, and
U.S. Pat. No. 10,715,960 B1, each of which is incorporated by reference for the purpose of teaching how to make and use location engine 502.

Sentry module 503 is software that:

(1) decides whether wireless terminal 301-*j* is within or outside of proscribed area 321 based on the estimate of the location of wireless terminal 301-*j* as provided by location engine 502, and (2) requests that service to wireless terminal 301-*j* be denied—blocked or blacklisted, as appropriate, when:
  (i) wireless terminal 301-*j* is estimated to be within proscribed area 321, and
  (ii) service to wireless terminal 301-*j* is not being blocked or blacklisted, and (3) requests that service to wireless terminal 301-*j* be restored—un-blocked or un-blacklisted, as appropriate, when:
  (i) wireless terminal 301-*j* is estimated to be outside of proscribed area 321, and
  (ii) service to wireless terminal 301-*j* is being blocked or blacklisted, and (4) updates list of blocked and blacklisted wireless terminals 504, as appropriate.

The processes performed by sentry module 502 are illustrated in greater detail below and in accordance with the accompanying figures.

List of blocked and blacklisted wireless terminals 504 is a list that enables service sentry 312 to be aware of which wireless terminals are currently being blocked or blacklisted, as appropriate. In particular, list of blocked and blacklisted wireless terminals 504 is a list of those wireless terminals service sentry 312 has:

(i) requested operator determined barring module 404 to block, or (ii) requested equipment identity register 405 to blacklist and that service sentry 312 has not requested be un-blocked or un-blacklisted, as appropriate. It will be clear to those skilled in the art, after reading this disclosure, how to make and use list of blocked and blacklisted wireless terminals 504.

Definition of proscribed area 321 is a geometric definition of proscribed area 321. In accordance with the illustrative embodiment, proscribed area 321 is a convex polygon that is defined by the latitude and longitude of its vertices. It will be clear to those skilled in the art, after reading this disclosure, how to make and use alternative embodiments of the present invention in which the proscribed area is defined as any enclosed two-dimensional area or areas (e.g., circles, ellipses, squares, rectangles, polygons, irregular areas, etc.) or any three-dimensional volume or volumes (e.g., spheres, ellipsoids, cubes, boxes, polyhedral, irregular volumes, etc.).

Figure 6:
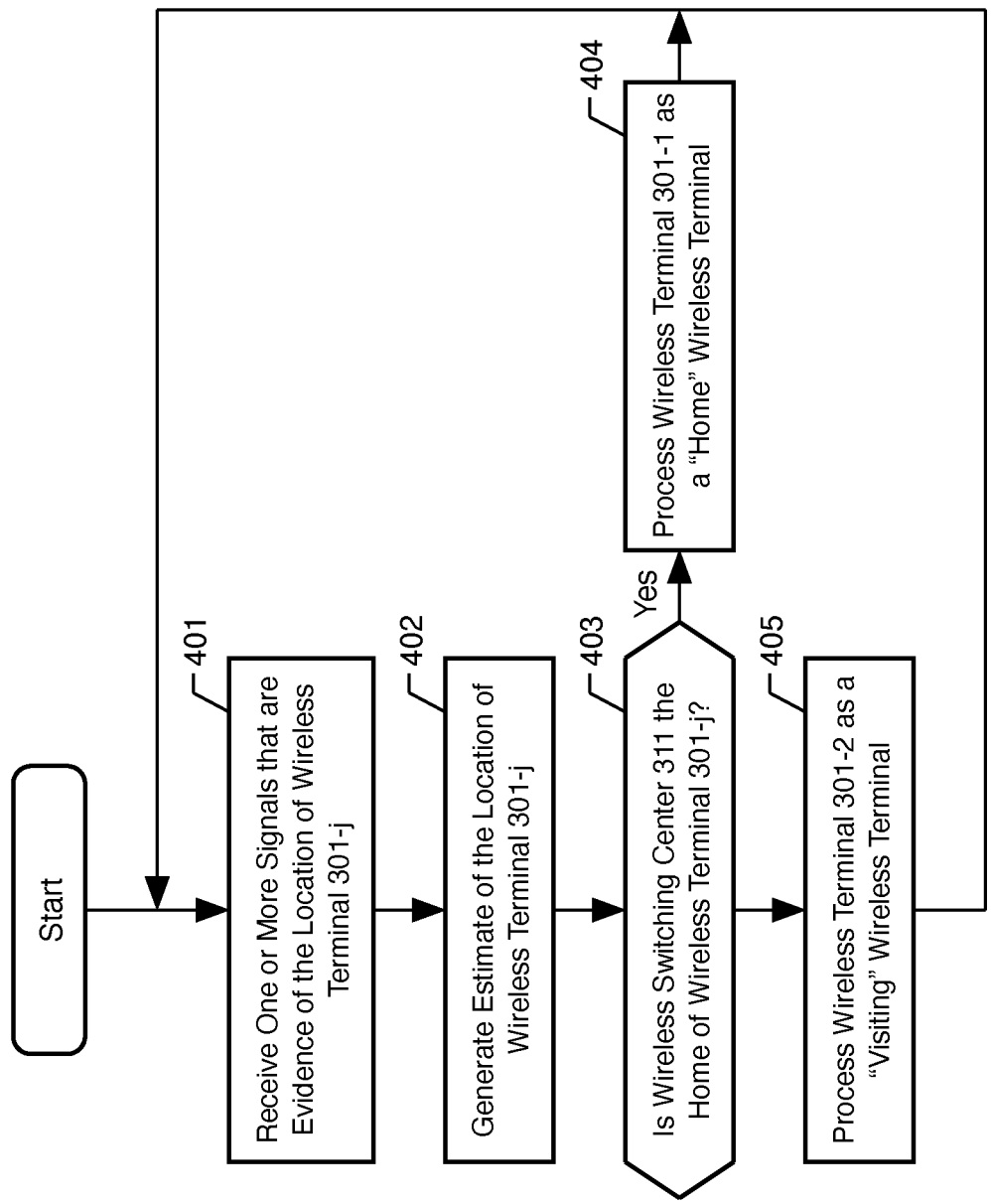
FIG. 6 depicts a flowchart of the operation of the illustrative embodiment of the present invention.

FIG. 6 depicts a flowchart of the operation of the illustrative embodiment of the present invention.

At task 401, service sentry 312 receives one or more signals from wireless switching center 311 that are evidence of the location of wireless terminal 301-*j*. Sometimes the signals are provided to service sentry 312 by wireless switching center 311 in response to a request by service sentry 312 for those signals, and sometimes the signals are provided by wireless switching center 311 of its own accord (i.e., spontaneously) in response to a network event (e.g., wireless terminal 301-*j* crossing a cell boundary, etc.). It will be clear to those skilled in the art, after reading this disclosure, how to make and use service sentry 312 so that it is capable of performing task 401.

At task 402, service sentry 312 uses location engine 502 to generate:

(i) an estimate of the location of wireless terminal 301-*j*, and (ii) a measure of the certainty of the estimate of the location of wireless terminal 301-*j*, based on the signal or signals received in task 401. In accordance with the illustrative embodiment, the estimate is described by a two-dimensional location (e.g., a longitudinal/latitudinal coordinate pair, etc.) but it will be clear to those skilled in the art, after reading this disclosure, how to make and use alternative embodiments of the present invention in which the estimate is described by a three-dimensional location (e.g., a longitude/latitude/altitude 3-tuple, etc.) or a one-dimensional location (e.g., a latitude only, or a latitude only, or an altitude only, etc.). In accordance with the illustrative embodiment, the estimate of location is accompanied by a measure of certainty (i.e., a real value x in the range $0 \leq x \leq 1$). It will be clear to those skilled in the art, after reading this disclosure, how to make and use alternative embodiments of the present invention in which the estimate of location is accompanied by a measure of uncertainty. It will be clear to those skilled in the art, after reading this disclosure, how to make and use service sentry 312 so that it is capable of performing task 402.

At task 403, service sentry 312 bifurcates the processing for those wireless terminals whose home is wireless switching center 311 from those who have roamed into the purview of wireless switching center 311. Control for those wireless terminals (e.g., wireless terminal 301-1, etc.) whose home is wireless switching center 311 proceeds to task 404. In contrast, control for those wireless terminals (e.g., wireless terminal 301-2, etc.) who are roaming proceeds to task 405. It will be clear to those skilled in the art, after reading this disclosure, how to make and use service sentry 312 so that it is capable of performing task 403.

At task 404, service sentry 312 processes wireless terminal 301-1 as a "home" wireless terminal. Task 404 is described in detail below and in the accompanying figure. After task 404 has been completed, control returns to task 401.

At task 405, service sentry 312 processes wireless terminal 301-2 as a "visiting" wireless terminal. Task 405 is described in detail below and in the accompanying figure. After task 405 has been completed, control returns to task 401.

Figure 7:
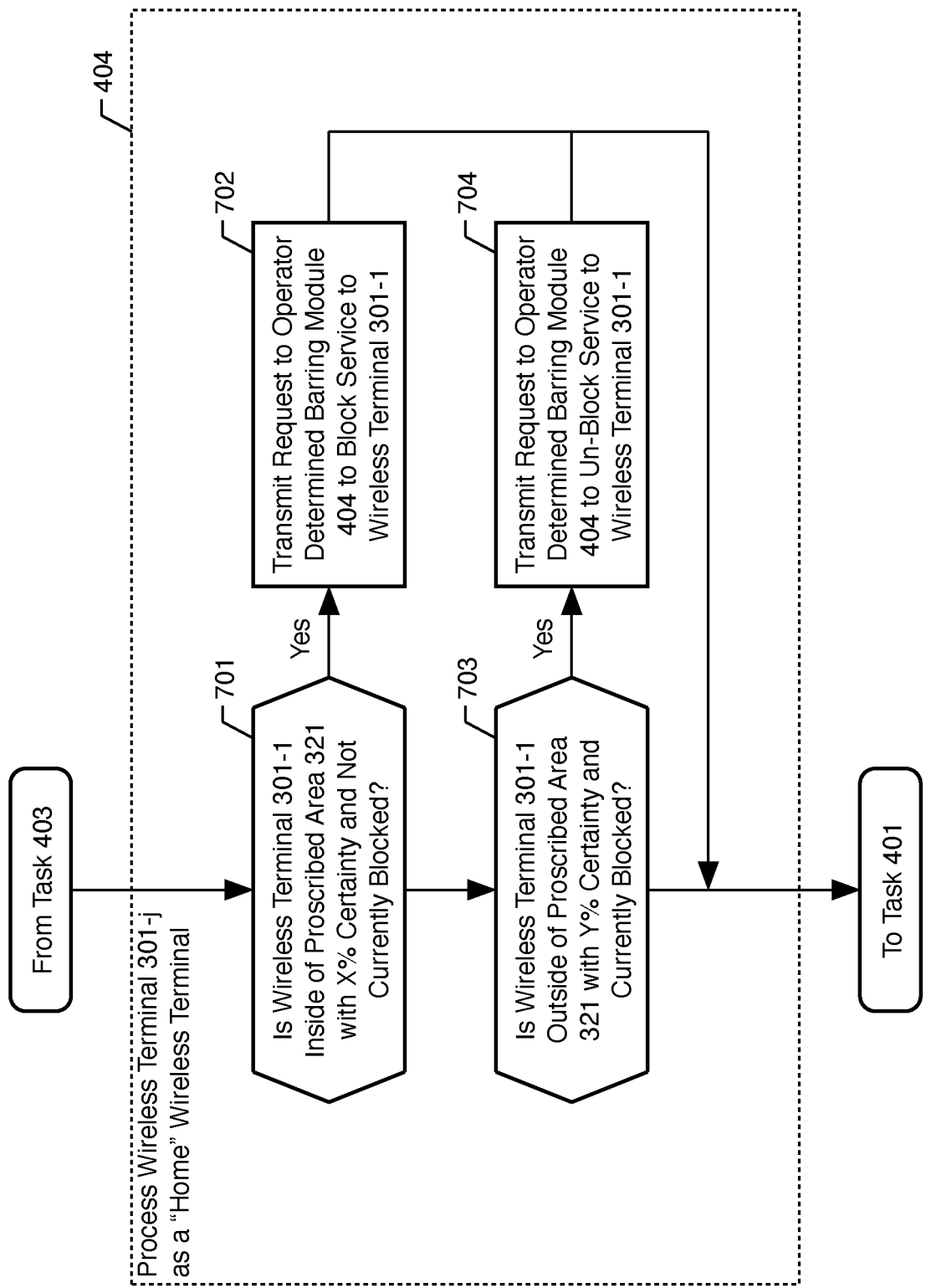
FIG. 7 depicts a flowchart of the salient subtasks associated with the performance of task 404—processing wireless terminal 301-1 as a "home" (i.e., not "roaming") wireless terminal of wireless switching center 311.

FIG. 7 depicts a flowchart of the salient subtasks associated with the performance of task 404—processing wireless terminal 301-1 as a "home" (i.e., not "roaming") wireless terminal of wireless switching center 311.

At task 701, service sentry 312 uses the software and data in sentry module 503 to determine:
(i) is wireless terminal 301-1 within proscribed area 321 with X % certainty, and
(ii) is service to wireless terminal 301-1 currently blocked by operator determined barring module 404?

If the answer to (i) is "Yes" and (ii) is "No," then control passes to task 702; otherwise, control passes to task 703.

It will be clear to those skilled in the art, after reading this disclosure, how to make and use service sentry 312 so that it can determine whether wireless terminal 301-1 is within proscribed area 321 with X % certainty. In accordance with the illustrative embodiment, X % equals 85% (i.e., X=0.85), but it will be clear to those skilled in the art, after reading this disclosure, how to make and use alternative embodiments of the present invention in which X is any real value in the range $0 \leq X \leq 1$.

In accordance with the illustrative embodiment, service sentry 312 determines whether service to wireless terminal 301-1 is currently blocked by operator determined barring module 404 by querying list of blocked and blacklisted wireless terminals 504.

It will be clear to those skilled in the art, after reading this disclosure, how to make and use service sentry 312 so that it is capable of performing task 701.

At task 702, service sentry 312 uses the software and data in sentry module 503 to transmit a request to operator determined barring module 404—via ODB interface module 406—to block wireless terminal 301-1, which would have the effect of causing wireless switching center 311 to deny service to wireless terminal 301-1. As part of task 702, service sentry 312 adds wireless terminal 301-1 to list of blocked and blacklisted terminals 504.

It will be clear to those skilled in the art, after reading this disclosure, how to make and use service sentry 312 so that it is capable of performing task 702.

At task 703, service sentry 312 uses the software and data in sentry module 503 to determine:
(i) is wireless terminal 301-1 outside of proscribed area 321 with Y % certainty, and
(ii) is service to wireless terminal 301-1 currently blocked by operator determined barring module 404?

If the answer to (i) is "Yes" and (ii) is "Yes," then control passes to task 704; otherwise, control passes to task 401.

It will be clear to those skilled in the art, after reading this disclosure, how to make and use service sentry 312 so that it can determine whether wireless terminal 301-1 is outside of proscribed area 321 with Y % certainty. In accordance with the illustrative embodiment, Y % equals 95% (i.e., Y=0.95), but it will be clear to those skilled in the art, after reading this disclosure, how to make and use alternative embodiments of the present invention in which Y is any real value in the range $0 \leq Y \leq 1$.

In accordance with the illustrative embodiment Y>X. The reason is that:
(i) location engine 502 can make an error in estimating the location of wireless terminal 301-$j$, or
(ii) sentry module 503 can make an error in determining whether the estimated location of wireless terminal 301-$j$ is within or outside of proscribed area 321, or
(iii) both i and ii.

In particular, there are two kinds of errors:
Type I Error—service sentry 312 estimates that wireless terminal 301-$j$ is outside of proscribed area 321 when, in fact, it is within proscribed area 321, and
Type II Error—service sentry 312 estimates that wireless terminal 301-$j$ is within proscribed area 321 when, in fact, it is outside of proscribed area 321.

In accordance with the illustrative embodiment, a Type I Error is considered more problematic than a Type II Error. In other words, it is better to block or blacklist, as appropriate, a wireless terminal that is outside of proscribed area 321 than it is to not block or blacklist a wireless terminal that is within proscribed area 321. To accomplish this, two different certainty thresholds X % and Y %—are established and Y>X. It will be clear to those skilled in the art, after reading this disclosure, how to make and use alternative embodiments of the present invention in which Y<X and Y=X.

In accordance with the illustrative embodiment, service sentry 312 determines whether service to wireless terminal 301-1 is currently blocked by operator determined barring module 404 by querying list of blocked and blacklisted wireless terminals 504.

It will be clear to those skilled in the art, after reading this disclosure, how to make and use service sentry 312 so that it is capable of performing task 703.

At task 704, service sentry 312 uses the software and data in sentry module 503 to transmit a request to operator determined barring module 404—via ODB interface module 406—to un-block wireless terminal 301-1, which would have the effect of causing wireless switching center 311 to restore service to wireless terminal 301-1. As part of task 704, service sentry 312 removes wireless terminal 301-1 from list of blocked and blacklisted terminals 504.

It will be clear to those skilled in the art, after reading this disclosure, how to make and use service sentry 312 so that it is capable of performing task 704.

Figure 8:
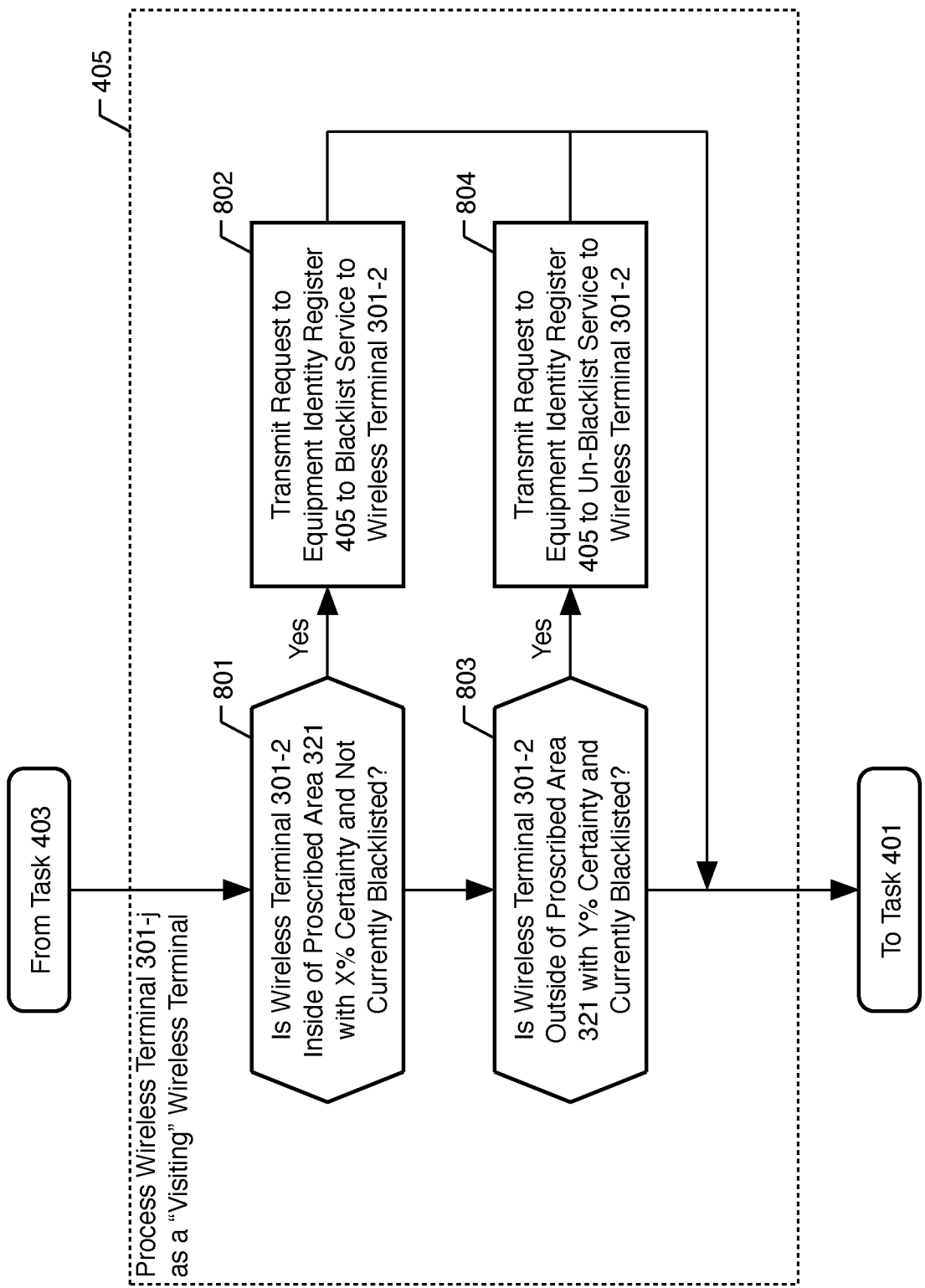
FIG. 8 depicts a flowchart of the salient subtasks associated with the performance of task 405—processing wireless terminal 301-2 as a "visiting" (i.e., "roaming") wireless terminal of wireless switching center 311.

FIG. 8 depicts a flowchart of the salient subtasks associated with the performance of task 405—processing wireless terminal 301-2 as a "visiting" (i.e., "roaming") wireless terminal of wireless switching center 311.

At task 801, service sentry 312 uses the software and data in sentry module 503 to determine:
(i) is wireless terminal 301-2 within proscribed area 321 with X % certainty, and
(ii) is wireless terminal 301-2 currently blacklisted by equipment identity register 406?

If the answer to (i) is "Yes" and (ii) is "No," then control passes to task 802; otherwise, control passes to task 803.

It will be clear to those skilled in the art, after reading this disclosure, how to make and use service sentry 312 so that it can determine whether wireless terminal 301-2 is within proscribed area 321 with X % certainty. In accordance with the illustrative embodiment, service sentry 312 determines whether service to wireless terminal 301-2 is currently blacklisted by equipment identity register 406 by querying list of blacklisted and blacklisted wireless terminals 504.

It will be clear to those skilled in the art, after reading this disclosure, how to make and use service sentry 312 so that it is capable of performing task 801.

At task 802, service sentry 312 uses the software and data in sentry module 503 to transmit a request to equipment identity register 406—via EIR interface module 407—to blacklist wireless terminal 301-2, which would have the effect of causing wireless switching center 311 to deny service to wireless terminal 301-2. As part of task 802, service sentry 312 adds wireless terminal 301-2 to list of blocked and blacklisted terminals 504.

It will be clear to those skilled in the art, after reading this disclosure, how to make and use service sentry 312 so that it is capable of performing task 802.

At task 803, service sentry 312 uses the software and data in sentry module 503 to determine:
  (i) is wireless terminal 301-2 outside of proscribed area 321 with Y % certainty, and
  (ii) is wireless terminal 301-2 currently blacklisted by equipment identity register 406?
If the answer to (i) is "Yes" and (ii) is "Yes," then control passes to task 804; otherwise, control passes to task 401.

It will be clear to those skilled in the art, after reading this disclosure, how to make and use service sentry 312 so that it can determine whether wireless terminal 301-2 is outside of proscribed area 321 with Y % certainty. In accordance with the illustrative embodiment, service sentry 312 determines whether service to wireless terminal 301-2 is currently blacklisted by equipment identity register 406 by querying list of blacklisted and blacklisted wireless terminals 504.

It will be clear to those skilled in the art, after reading this disclosure, how to make and use service sentry 312 so that it is capable of performing task 803.

At task 804, service sentry 312 uses the software and data in sentry module 503 to transmit a request to equipment identity register 406—via EIR interface module 407—to un-blacklist wireless terminal 301-2, which would have the effect of causing wireless switching center 311 to restore service to wireless terminal 301-2. As part of task 804, service sentry 312 removes wireless terminal 301-2 from list of blocked and blacklisted terminals 504.

It will be clear to those skilled in the art, after reading this disclosure, how to make and use service sentry 312 so that it is capable of performing task 804.

What is claimed is:

1. A method comprising:
  receiving a first signal that is evidence of a location of a wireless terminal at a first time, wherein the wireless terminal is being provided wireless telecommunications service by a wireless telecommunications system;
  generating an estimate of whether the wireless terminal is within a proscribed area at the first time based on the first signal; and
  when:
    (i) the wireless terminal is estimated to be within the proscribed area, and
    (ii) the wireless terminal is a native user of the wireless telecommunications system,
  transmitting, to an operator determined barring module in the wireless telecommunications system, a request to block service to the wireless terminal; and
  when:
    (i) the wireless terminal is estimated to be within the proscribed area, and
    (ii) the wireless terminal is a non-native user of the wireless telecommunications system,
  transmitting, to an equipment identity register in the wireless telecommunications system, a request to blacklist the wireless terminal.

2. The method of claim 1 further comprising:
  receiving a second signal that is evidence of a location of the wireless terminal at a second time, wherein the second time is different than the first time;
  generating a second estimate of whether the wireless terminal is outside of the proscribed area at the second time based on the second signal;
  when:
    (i) the wireless terminal is estimated to be outside of the proscribed area, and
    (ii) the wireless terminal is a native user of the wireless telecommunications system,
  transmitting, to an operator determined barring module in the wireless telecommunications system, a request to un-block service to the wireless terminal; and
  when:
    (i) the wireless terminal is estimated to be outside of the proscribed area, and
    (ii) the wireless terminal is a non-native user of the wireless telecommunications system,
  transmitting, to an equipment identity register in the wireless telecommunications system, a request to un-blacklist service to the wireless terminal.

3. A method comprising:
  receiving a signal that is evidence of a location of a wireless terminal at a first time, wherein the wireless terminal is being provided wireless telecommunications service by a wireless telecommunications system;
  generating an estimate of whether the wireless terminal is outside of a proscribed area at the first time based on the signal;
  when;
    (i) the wireless terminal is estimated to be outside of the proscribed area, and
    (ii) the wireless terminal is a native user of the wireless telecommunications system,
  transmitting, to an operator determined barring module in the wireless telecommunications system, a request to un-block service to the wireless terminal; and
  when:
    (i) the wireless terminal is estimated to be outside of the proscribed area, and
    (ii) the wireless terminal is a non-native user of the wireless telecommunications system,
  transmitting, to an operator determined barring module in the wireless telecommunications system, a request to un-blacklist service to the wireless terminal.

4. A method comprising:
  receiving a signal that is evidence of a location of a wireless terminal at a first time, wherein the wireless terminal is being provided wireless telecommunications service by a wireless telecommunications system;

generating an estimate of whether the wireless terminal is within a proscribed area at the first time based on the signal;

transmitting, to an operator determined barring module in the wireless telecommunications system, a request to block service to the wireless terminal when:
  (i) the wireless terminal is estimated to be within the proscribed area; and
  (ii) the wireless terminal is a native user of the wireless telecommunications system; and transmitting, to an equipment identity register in the wireless telecommunications system, a request to blacklist the wireless terminal when:
  (i) the wireless terminal is estimated to be within the proscribed area; and
  (ii) the wireless terminal is a non-native user of the wireless telecommunications system.

5. A method comprising:

receiving a signal that is evidence of a location of a wireless terminal at a first time, wherein the wireless terminal is being provided wireless telecommunications service by a wireless telecommunications system;

generating an estimate of whether the wireless terminal is outside of a proscribed area at the first time based on the signal;

transmitting, to an operator determined barring module in the wireless telecommunications system, a request to un-block service to the wireless terminal when:
  (i) the wireless terminal is estimated to be outside of the proscribed area; and
  (ii) the wireless terminal is a native user of the wireless telecommunications system; and transmitting, to an equipment identity register in the wireless telecommunications system, a request to un-blacklist the wireless terminal when:
  (i) the wireless terminal is estimated to be outside of the proscribed area; and
  (ii) the wireless terminal is a non-native user of the wireless telecommunications system.

* * * * *